(12) United States Patent  
Borza

(10) Patent No.: US 7,889,861 B2
(45) Date of Patent: Feb. 15, 2011

(54) MULTIPLE SEQUENTIAL SECURITY KEY ENCRYPTION-DECRYPTION

(75) Inventor: Michael Borza, 2036 Woodcrest Road, Ottawa, Ontario (CA) K1H 6H8

(73) Assignee: Michael Borza, Ottawa, Ontario (CA)

( * ) Notice: Subject to any disclaimer, the term of this patent is extended or adjusted under 35 U.S.C. 154(b) by 824 days.

(21) Appl. No.: 11/898,535

(22) Filed: Sep. 13, 2007

(65) Prior Publication Data

US 2008/0063207 A1 Mar. 13, 2008

Related U.S. Application Data

(60) Provisional application No. 60/844,078, filed on Sep. 13, 2006.

(51) Int. Cl.
*H04L 9/00* (2006.01)

(52) U.S. Cl. .............................. 380/43; 380/29; 380/37; 380/42; 380/277; 380/286

(58) Field of Classification Search .................. 380/29, 380/37, 42, 43, 277, 286
See application file for complete search history.

(56) References Cited

U.S. PATENT DOCUMENTS

| 5,297,207 | A | | 3/1994 | Degele | |
|---|---|---|---|---|---|
| 5,345,505 | A | | 9/1994 | Pires | |
| 5,835,599 | A | * | 11/1998 | Buer | 380/29 |
| 6,088,800 | A | * | 7/2000 | Jones et al. | 713/189 |
| 6,185,304 | B1 | * | 2/2001 | Coppersmith et al. | 380/37 |
| 6,598,161 | B1 | | 7/2003 | Kluttz et al. | |
| 6,760,439 | B1 | * | 7/2004 | Windirsch | 380/37 |
| 7,103,772 | B2 | | 9/2006 | Jorgensen et al. | |
| 7,158,638 | B2 | * | 1/2007 | Okada et al. | 380/37 |
| 7,570,760 | B1 | * | 8/2009 | Olson et al. | 380/37 |
| 7,702,100 | B2 | * | 4/2010 | Han et al. | 380/28 |
| 2001/0050989 | A1 | * | 12/2001 | Zakiya | 380/29 |
| 2002/0015492 | A1 | * | 2/2002 | Ohmori et al. | 380/37 |
| 2002/0021802 | A1 | * | 2/2002 | Muratani et al. | 380/29 |
| 2003/0079124 | A1 | | 4/2003 | Serebrennikov | |
| 2008/0013720 | A1 | * | 1/2008 | Degele | 380/43 |
| 2008/0130889 | A1 | * | 6/2008 | Qi et al. | 380/257 |

FOREIGN PATENT DOCUMENTS

WO WO 02/084461 A1 10/2002

OTHER PUBLICATIONS

ISA/CA, International Search Report mailed Dec. 27, 2007, Gatineau, Canada.

* cited by examiner

*Primary Examiner*—Nabil M El Hady
(74) *Attorney, Agent, or Firm*—Freedman & Associates

(57) ABSTRACT

A method for reducing the memory requirements of executing ciphering processes is disclosed which utilizes sequential key extraction and ciphering. By providing a base key for extracting therefrom multiple first sequential security keys; each key is sequentially extracted and employed. During the process overwriting of each sequential security key occurs with the next subsequently extracted sequential security key. In this manner memory requirements are lowered, power consumption reduced which are important in mobile applications.

25 Claims, 5 Drawing Sheets

MULTIPLE SEQUENTIAL SECURITY KEY ENCRYPTION-DECRYPTION

This application claims priority to a provisional application No. 60/844,078 filed Sep. 13, 2006.

FIELD OF THE INVENTION

The invention relates to the field of electronic data security and more particularly to the field of extraction of sequential keys.

BACKGROUND OF THE INVENTION

In recent years the rapid adoption of wireless communication technology has triggered a rapid increase in the ability of people to conduct their lives whilst on the move. Technological advances resulting in a combination of compact, low power, efficient, high speed, and ergonomically designed microprocessor based portable devices with advanced communications have spearheaded this adoption. With each generation, better, more user friendly or more advantageous features are added. Present wireless communication devices support a wide variety of applications including: World Wide Web access, text messaging, voice communications, address book management, scheduling, alarm clock, electronic mail, camera, video camera, video conferencing, and so forth. Only a few years ago, many of these features were only available on a desktop computer system.

New features and applications are released, typically every year. For example, present systems now support the procurement and presentation of multiple media formats, including MPEG music, streamed video, news stories, and even books, through to the online purchase of items directly from company websites or other locations. This is now coupled with other facilities designed to make life easier for people on the move, and coincidentally acts to lower individual and corporate installation requirements for each office. This often results in lower office space requirements and in lower staffing requirements.

In most of these applications and others, there exists the requirement to transfer information in a secure manner. This need is driven from both ends of the communication path, for example, either from the users' viewpoint of providing bank account details, credit card numbers etc through to the service provider who seeks to similarly protect confidential information but also limit the dissemination of procured media content thereby reducing theft.

Common to many security techniques are encryption mechanisms wherein data to be transmitted is obfuscated—transformed to seemingly meaningless information—through an encryption process utilising encryption keys which are either separately communicated or synchronized to allow the information to be reverse-transformed—recovered—after transmission via an insecure medium, such as the Internet. Different approaches are known using public and private key forms, multiple keys, and even multiple keys to encode different sections of the same information.

Some encryption processes require that the encryption key is expanded prior to use. When key expansion is necessary, these keys are stored in their expanded form during use so that the expanded keys are readily available and processing time for key expansion is not necessary during the ciphering process. For a system managing for example multiple network data traffic flows simultaneously, such a pre-expansion is beneficial to ensure that system performance is not affected when context switching occurs. As such, when in common use, each key is stored both in its initial form and in its expanded form. Such approaches therefore require additional memory resources for the storage of the extracted keys but save processing time for extracting those keys repeatedly during use. Such approaches also have inherently lower security as an unauthorized access to the device or memory may extract all or some of the expanded encryption keys.

For the manufacturers of many portable devices there is benefit in being able to lower the memory requirements of these devices, both to reduce cost of the memory itself but to also reduce the power consumption of the memory and increase the stand-by or active life of the device before requiring recharging. Such benefits are advantageous where they do not come at the expense of overall performance of the portable device.

It would therefore be advantageous to use a ciphering process that reduces memory storage resource requirements but provides approximately equivalent performance.

SUMMARY OF THE INVENTION

According to an embodiment of the invention there is provided a method comprising;
   (a) providing a first base key for extracting therefrom a plurality of first sequential security keys;
   (b) sequentially extracting from the first base key a plurality of first sequential security keys including a first sequential key;
   (c) providing a second base key for extracting therefrom multiple second sequential security keys;
   (d) sequentially extracting from the second base key a plurality of second sequential security keys including a second sequential key; and
   (e) overwriting said first sequential key with the second sequential key subsequently extracted prior to completely extracting all of the multiple first sequential security keys relating to the first base key.

In accordance with another embodiment of the invention there is provided a cipher processor comprising a pipeline processor comprising N stages, each stage for extracting a sequential key and for ciphering of data using the extracted sequential key, the pipeline for providing at least the sequential key in a feed forward fashion to a subsequent stage for subsequent extraction therefrom of a subsequent sequential key, the extracted sequential keys for use in a ciphering stage and for being fed forward to a subsequent stage but other than for long term storage within memory of the cipher processor.

In accordance with another embodiment of the invention there is provided a computer readable medium having stored therein data according to a predetermined computing device format, and upon execution of the data by a suitable computing device a security method is provided comprising:
   a) providing a first base key for extracting therefrom a plurality of first sequential security keys;
   b) sequentially extracting from the first base key a plurality of first sequential security keys including a first sequential key;
   c) providing a second base key for extracting therefrom multiple second sequential security keys;
   d) sequentially extracting from the second base key a plurality of second sequential security keys including a second sequential key; and
   e) overwriting said first sequential key with the second sequential key subsequently extracted prior to completely extracting all of the multiple first sequential security keys relating to the first base key.

In accordance with another embodiment of the invention there is provided a computer readable medium having stored therein data according to a predetermined computing device format, and upon execution of the data by a suitable computing device a circuit for implementing a security method is provided comprising:

a pipeline processor comprising N stages, each stage for extracting a sequential key and for ciphering of data using the extracted sequential key, the pipeline for providing at least the sequential key in a feed forward fashion to a subsequent stage for subsequent extraction therefrom of a subsequent sequential key, the extracted sequential keys for use in a ciphering stage and for being fed forward to a subsequent stage but other than for long term storage within memory of the cipher processor.

DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
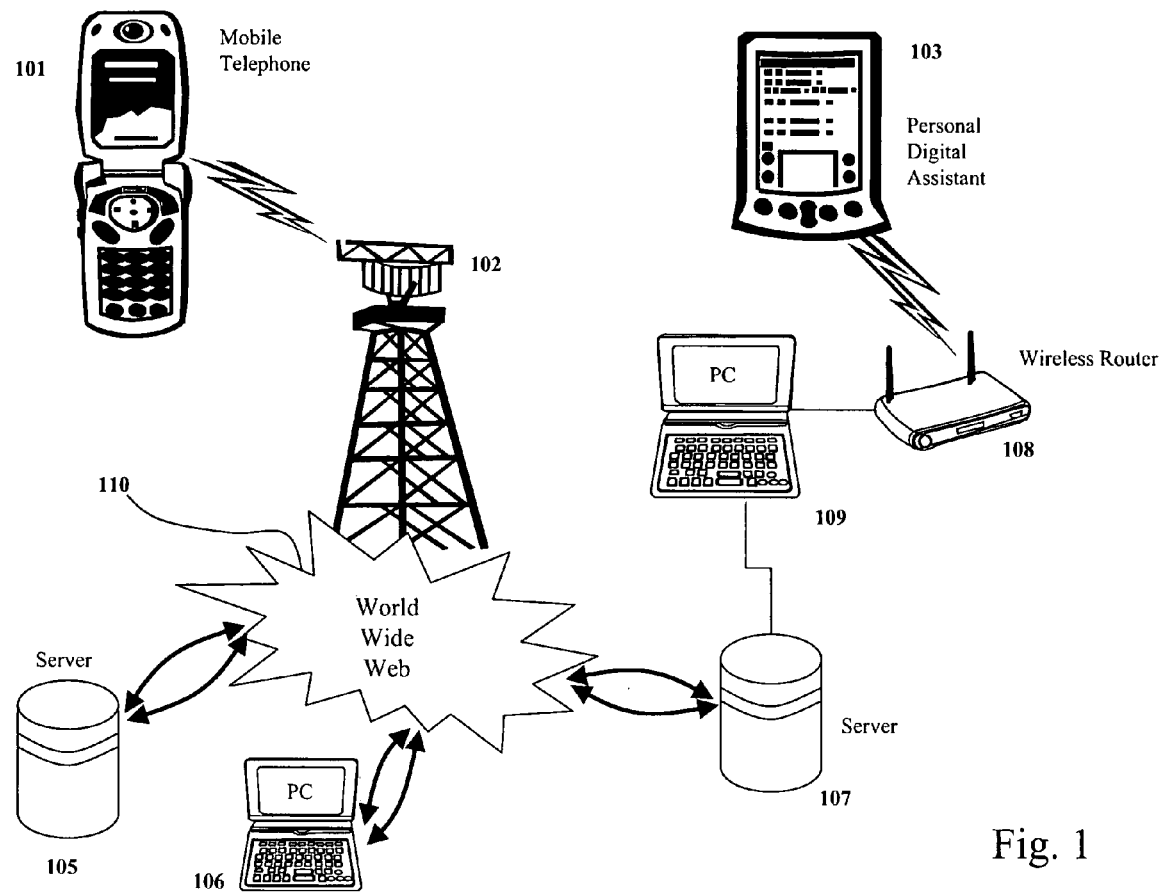
FIG. 1 illustrates a typical application environment of portable devices within a communications network.

Referring to FIG. 1, shown is a simplified schematic of two portable devices having communications therebetween according to a method of secure encryption. As shown a mobile telephone 101 is in wireless communication with a cellular network base station 102 allowing the user of the mobile telephone 101 to access multiple services, including for example the Internet 110. In the course of using the mobile telephone 101, the user optionally accesses from multiple service providers different services including for example exchange of email text messaging with a user at a personal computer 106, execution of financial transactions with a bank through a central server 105, and downloading of media content from a file server 107 belonging to a music company.

Also coupled to the file server 107 is a microprocessor-based computer 109. Attached to the microprocessor-based computer 109 is a wireless router 108. In this example the wireless router is within a store of the music company and allows users to locally procure content from this music company. Interfacing to the wireless router 108 is a user operating a personal digital assistant (PDA) 103 through which they are able to download music directly from the company's file server 107.

Figure 2:
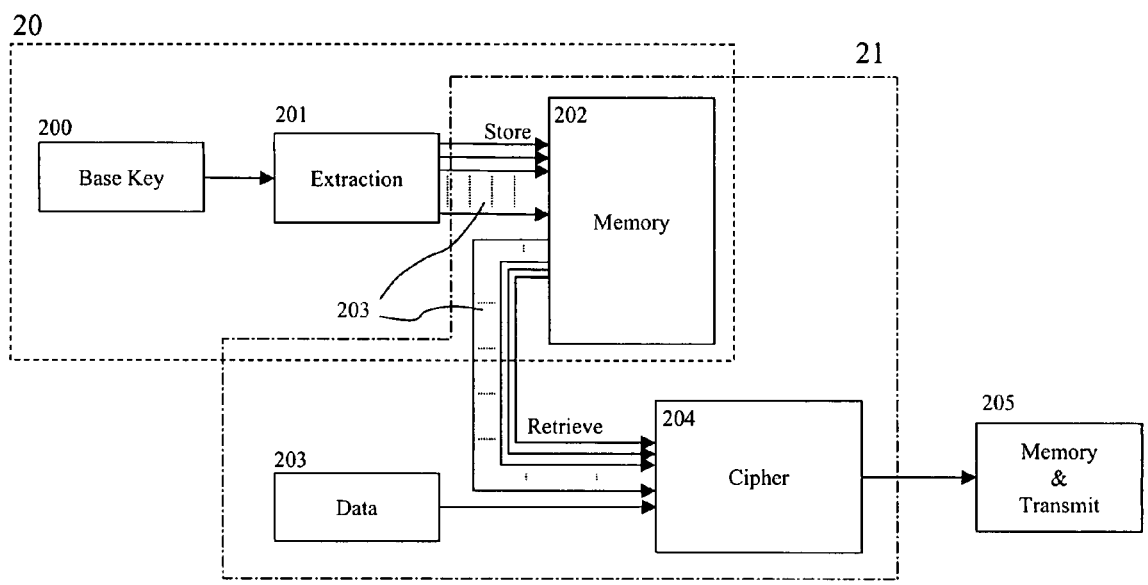
FIG. 2 illustrates a prior art approach to key extraction and encryption.

Referring to FIG. 2 shown is a prior art encryption approach such as employed in the portable devices of FIG. 1. Shown is a first key extraction process 20 wherein the basekey 200 undergoes an initial extraction process 201 wherein all the expanded keys 203 are generated from this initial extraction process 201. The plurality of expanded keys 203 are then stored within a first memory block 202 for subsequent extraction and use.

Subsequently in a ciphering process 21 the expanded keys 203 are retrieved from the first memory block 202 and entered into the ciphering block 204. Also entered into the ciphering block 204 is the data 203 to be ciphered. Upon completion of the ciphering process the ciphered data is transferred to a second memory block 205 for storage and transmission. Advantageously, the base key is only expanded once requiring a small amount of processing. Problematically, a large amount of memory is used for storing multiple expanded base keys when multiple streams are supported and a considerable amount of power is consumed moving the expanded keys.

Figure 3:
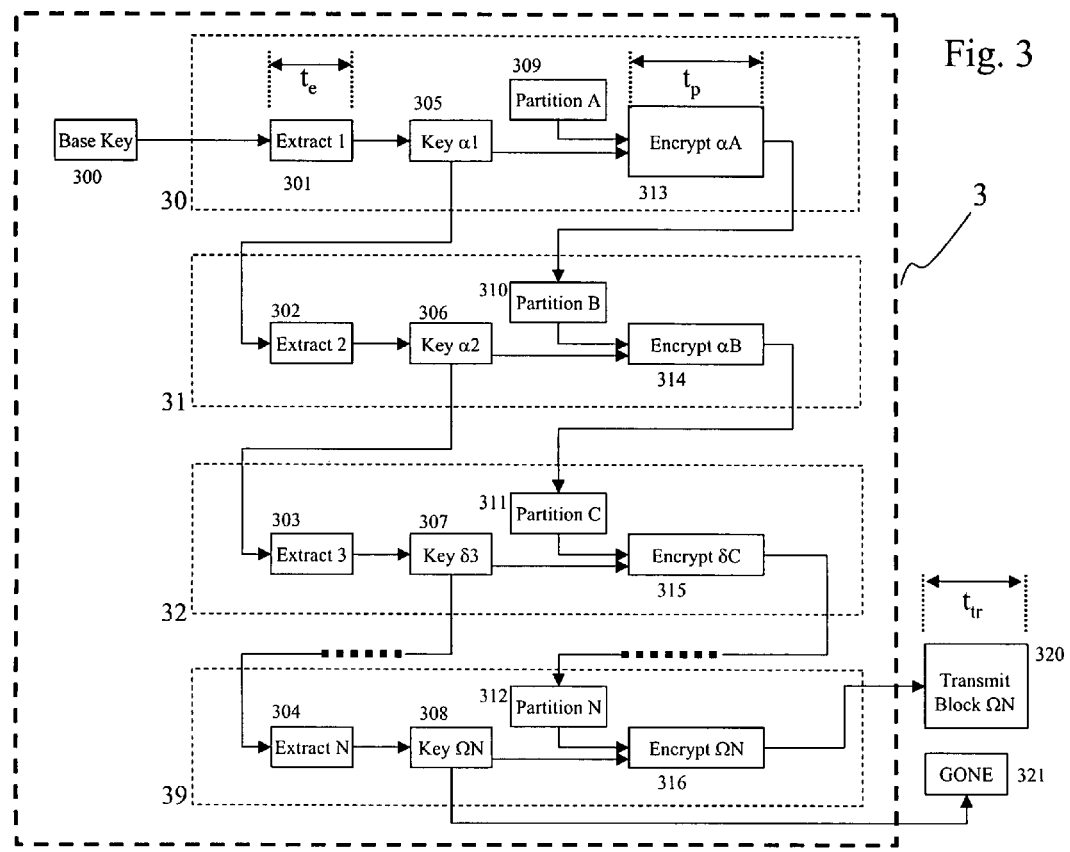
FIG. 3 illustrates an embodiment of the invention for sequential key extraction and use.

Now referring to FIG. 3 shown is an exemplary embodiment of an encryption process 3 Wherein a first ciphering process 30 takes the base key 300 and performs an extraction process 301 on the base key 300, this extraction process 301 resulting in the generation of a first sequential encryption key 305. This first sequential encryption key 305 is fed into a first ciphering block 313 along with the information to be ciphered, which is then stored in partition A 309. The output data from the first encryption process 313 is then forwarded and stored as partition B 310. Also fed forward is the first sequential encryption key 305 for use in generating therefrom the next sequential key.

These forwarded elements are then used within a second ciphering process 31. A second extraction process 302 operates upon the fed forward first sequential encryption key 305 and generates a second sequential encryption key 306 relating to a same base key. This second sequential encryption key 306 is used within a second ciphering block 314 along with the output data from the first ciphering block 313 which has been stored within the partition B 310. The output data from the second encryption process 314 is then forwarded and stored as partition C 311. Also fed forward is the second sequential encryption key 306 for use in generating therefrom the next sequential key.

These forwarded elements are then used within a third ciphering process 32. A third extraction process 303 operates upon the fed forward second sequential encryption key 306 and generates a third sequential encryption key 307. This third sequential encryption key 307 is used within a third ciphering block 315 along with the output data from the second ciphering block 314 which has been stored within the partition C 311. The output data of the third encryption process 315 is forwarded in the same manner as previous ciphering processes, as is the third sequential encryption key 307.

In this manner the ciphering process is repeated sequentially and exploits a repeated use of a common ciphering process, represented in the different stages by first, second, and third ciphering processes 30, 31 and 32 respectively. In operation therefore each sequentially extracted encryption key may be stored within the same memory location thereby overwriting the previous key until the final $N^{th}$ ciphering process 39. Within this $N^{th}$ ciphering process 39 the final sequential encryption key 308 is extracted by process 304 from the $(N-1)^{th}$ sequentially extracted key (not shown). In the same manner the $N^{th}$ ciphering block 316 takes this $N^{th}$ ciphering key 308 along with the $N^{th}$ partition N 312 and undertakes the final ciphering. The final ciphered data 316 is forwarded to a final transmission block 320 wherein it is stored and transmitted.

The final $N^{th}$ ciphering key 308 upon completion of the $N^{th}$ ciphering process 39 is deleted in the GONE process 321. Typically, this occurs when the final $N^{th}$ ciphering key 308 is overwritten without further propagation as opposed to through an active process of deleting same. In the same manner that the extracted keys may be stored within a single memory location the partitions storing each sequential stage of encoding may be the same, thereby rewriting the partition in each process, thereby lowering memory requirements for memory further.

Within the sequential ciphering processes 30 through 39 a time $t_e$ is assigned for the duration of each extraction process, $t_p$ for the time required to encrypt the data, and $t_{tr}$ for the time required to transmit the encrypted block. In respect of these ($t_e$ & $t_p$) are inversely scaleable with increasing processor speed, and ($t_{tr}$) similarly scales with the bandwidth of the communications path supporting the transmittal of the data. In the prior art the multiple parallel sequences therefore result in the total time for processing to be ($t_e+t_p+t_{tr}$), though $t_e$ is performed in advance and off-line and only one time. In this exemplary embodiment of the invention, the feed forward of the sequential key to the next extraction and the next sequential key extraction are undertaken whilst the ciphering is in process. In this exemplary embodiment the duration or latency for the complete ciphering process is now $Nt_e+t_p+t_{tr}$ where $t_e$ is longer than $t_p$, which is longer than the prior art but accomplished with 1/N of the memory requirements and reduced power consumption for storing the expanded keys. Typically $t_e$ is shorter than $t_p$ such that the result includes $N t_p$ and only a single $t_e$. In this way, by generating the sequential extracted keys in less time than is required for processing of the cipher data, little additional latency results and the memory and power savings are supported.

Of course, the above paragraph refers only to latency because after a first base key is provided to the first stage for processing, a second base key is optionally fed into the first stage of the process during the second stage allowing for processing of up to ten different basekeys simultaneously, each at a different stage of the sequencing. Alternatively, a same base key is provided for processing of different blocks of data. Thus, the latency is as described above, but the cipher processing speed can be improved by up to approximately an order of magnitude. Optionally, the encryption process 3 may balance speed, latency and power reduction by supporting two, or more, ciphering processes each associated with memory stores.

Figure 4:
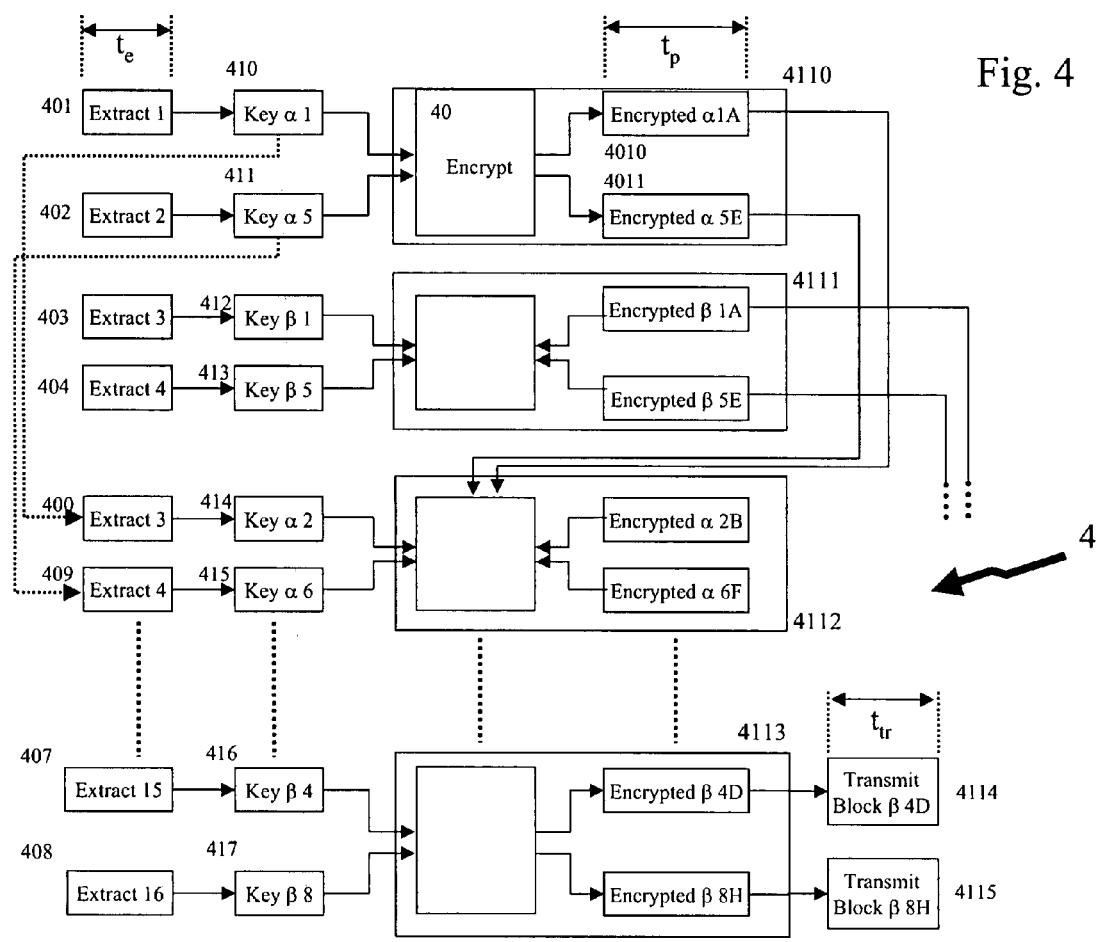
FIG. 4 illustrates a further embodiment of the invention wherein processing is batched allowing the designer to balance the processor speed, memory and power requirements against the time to complete an encryption.

Now referring to FIG. 4 shown is another exemplary embodiment as ciphering process 4. Shown are two initial extraction processes 401 and 402 that generate sequential encryption keys α1 410 and α5 411. These sequential encryption keys α1 410 and α5 411 are then used within an encryption sequence to generate encrypted content α1A 4010 and α5A 4011 respectively, which are then transmitted forward. In this first sequence the keys α1 410 and α5 411 are used simultaneously. Fed forward from this overall ciphering process are the encrypted content α1A 4010 and α5A 4011 and the first pair of sequentially extracted keys α1 410 and α5 411.

Now the processing returns to the top and two new extraction processes 403 and 404 generate a new pair of sequential encryption keys β1 412 and β5 413. These then are used in the next encryption process 4111. As shown the sequential encryption keys β1 412 and β5 413 represent the first two keys of a second master key β and not the third and fourth keys of the first master key α.

Again the processing sequence returns to the beginning with two new extraction processes 400 and 409 which act upon previously extracted keys α1 410 and α5 411 respectively to generate the second sequentially extracted pair of keys α2 414 and α6 415. This second sequentially extracted pair of keys α2 414 and α6 415 are then used within a ciphering process 4112. Also fed into this ciphering process 4112 are the previously encrypted data blocks α1A 4010 and α5E 4011.

This sequence repeats for both the α and β sequences until the final ciphering processes are completed. In this exemplary embodiment the final extractions processes for the β key sequence are processes 407 and 408 which generate the final sequential encryption keys β4 416 and β8 417, which are used in the final encryption process 4113. The output data of this final encryption process is two blocks of data β4D 4114 and β8H which are stored and subsequently transmitted.

Now, considering the same execution flow as the first exemplary embodiment then the extraction processes occur in sequence, whilst the ciphering process is being executed. In this exemplary second embodiment the duration or latency for the completed ciphering process is now $Mt_e+t_p+t_{tr}$ where $t_e$ is longer than $t_p$, and where M=N/X, X is the number of simultaneous sequential key extractions performed and N the total number of sequential key extractions for the full ciphering process. Of course if $t_e$ is shorter $t_p$ the result include N $t_p$. Hence if X=2, then M=N/2. This approach allows the designer of circuits supporting encryption processes a means of balancing the competing tradeoffs such that the circuit die area is adjustable at a cost of increased encryption time, which can be compensated for by increased processor speeds and/or transmission speeds. In this way, by generating the sequential extracted keys in less time than is required for processing of the cipher data, little additional latency results and memory and power savings are supported.

Figure 5:
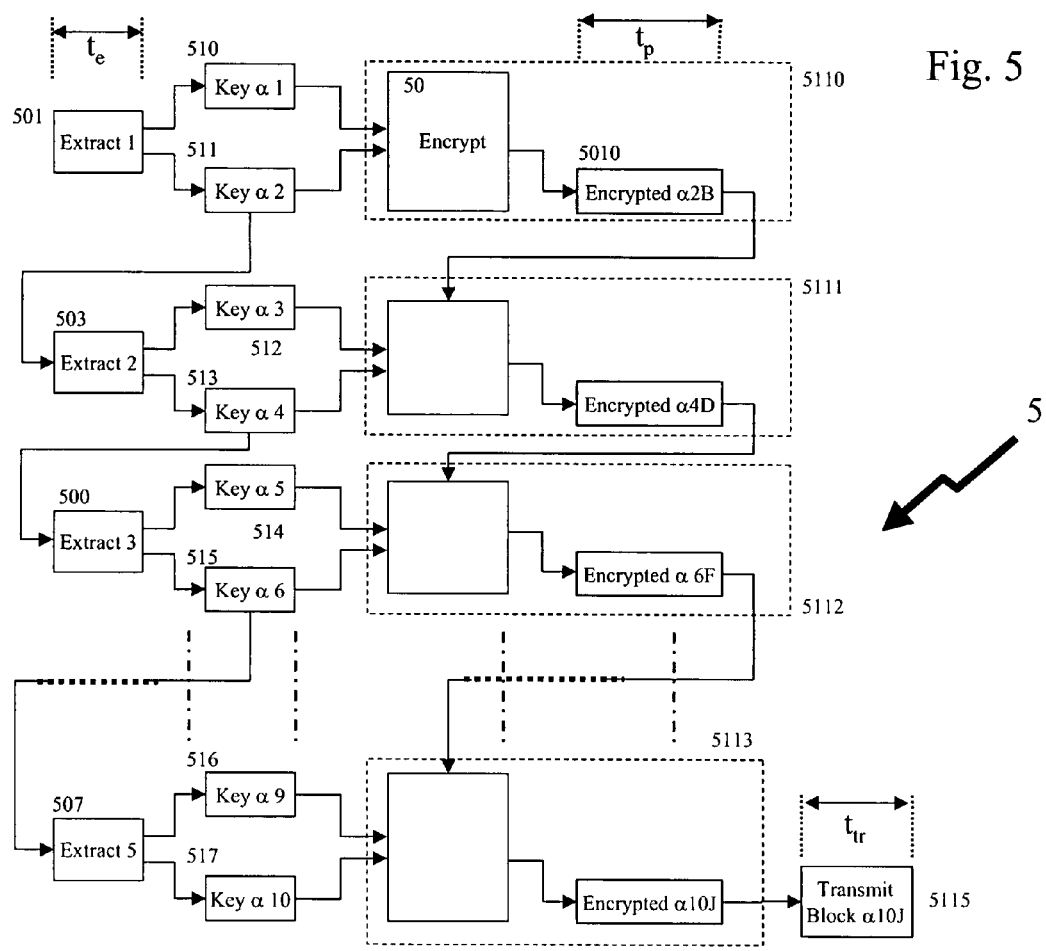
FIG. 5 illustrates another embodiment of the invention wherein processing is executed in multiple small batches wherein each batch is several ciphering processes with sequentially extracted keys, the approach allowing the designer to balance the processor speed, memory and power requirements against the time to complete an encryption.

Now referring to FIG. 5 shown is another exemplary embodiment as ciphering process 5. An initial extraction process 501 is shown which generates a pair of sequential encryption keys α1 510 and α2 511. These sequential encryption keys α1 510 and α2 511 are then used within an encryption sequence 50 to generate encrypted content α2B 5010. Within encryption sequence 50 the data to be ciphered is first encrypted using key α1 510 and then encrypted with α2 511. Fed forward from this first ciphering process 50 are the encrypted content α2B 5010 and the second sequentially extracted key α2 511.

Now the processing continues with a second extraction process 503 which generates a new pair of sequential encryption keys α3 512 and α4 513. These then are used in the next encryption process 5111 which operates from the encrypted output data α2B of the prior ciphering process 5110 to generate encrypted data α4D. Again the processing sequence returns to the beginning with a new extraction process 500 which acts upon the previously extracted key α4 513 to generate the third pair of sequentially extracted keys α5 514 and α6 515. This third sequentially extracted pair of keys α65 514 and α6 515 are then used within a ciphering process 5112. Also fed into this ciphering process 5112 is the previously encrypted data blocks α4D.

This sequence repeats until the final ciphering processes are completed. In this exemplary embodiment the final extraction processes for the α key sequence is process 507 which generates the final sequential encryption keys α9 516 and α10 517, which are used in the final encryption process 5113. The output data of this final encryption process is the encrypted block of data α10J which is stored and subsequently transmitted in process 5115.

Now, considering the same execution flow as the previously presented encryption process 3 then the extraction processes occur in series, each whilst the preceding ciphering process is being executed. In this exemplary embodiment the processing time for the overall encryption is $Mt_e+t_p+t_{tr}$ where M=N/X, X is the number of simultaneous sequential key extractions performed and N the total number of sequential key extractions for the full ciphering process. Hence if X=2, as described in the prior description of FIG. 5 then M=N/2. This approach allows the designer of processor circuits providing security processes a means of balancing the competing tradeoffs such that the memory requirements can be lowered at a cost of increased encryption time, which can be compensated for by increased processor speeds and/or transmission speeds.

Optionally, the preceding embodiments of the invention presented in FIGS. 3 through 5 relate to a decryption of data or information as opposed to the presented encryption. Whilst the exemplary embodiments have been described in respect of the benefits arising to implementing circuits for performing security processes involving encryption and decryption the embodiments may optionally be realized with other approaches including but not limited to integrated semiconductor circuits, hybrid circuits, finite state machines and dedicated hardwired processors.

Numerous other embodiments may be envisaged without departing from the spirit or scope of the invention.

What is claimed is:

1. A method for ciphering process comprising;
providing a first base key for extracting therefrom multiple of first sequential security keys;
sequentially extracting from the first base key a plurality of first sequential security keys including a first sequential key;
storing the first sequential key in a memory;
providing a second base key for extracting therefrom multiple second sequential security keys;
sequentially extracting from the second base key a plurality of second sequential security keys including a second sequential key; and
overwriting said first sequential key stored in the memory with the second sequential key subsequently extracted prior to completely extracting all of the multiple first sequential security keys relating to the first base key.

2. A method according to claim 1 wherein,
extracting a next sequential key from the multiple first sequential security keys is performed during a time that a previously extracted sequential key from the multiple first sequential security keys is used in a ciphering process.

3. A method according to claim 1 wherein,
extracting each sequential key of the at least one of multiple first sequential security keys and multiple second sequential security keys is performed by dedicated circuitry for extracting the sequential keys, the dedicated circuitry operating in parallel to the cipher circuitry.

4. A method according to claim 3 wherein,
extracting each sequential key is performed after storing of each prior extracted sequential key and during a use of the prior extracted sequential key within a ciphering process.

5. A method according to claim 4 wherein,
processing each of the sequential keys relates to processing sequential keys each relating to different base keys being processed concurrently, each of the plurality of sequential keys at a different stage of key extraction from a related base key.

6. A method according to claim 1 wherein,
the plurality of first sequential security keys are employed within a ciphering process.

7. A method according to claim 6 wherein,
the ciphering process is performed in N stages in parallel and wherein at a point in time a first base key is associated with one of the N stages and a second base key is associated with a first other stage of the N stages and at another point in time the first base key is associated with a second other stage of the N stages and the second base key is associated with a third other stage of the N stages.

8. A method according to claim 6 wherein,
the ciphering process is performed in N stages and wherein the base keys are provided to a first stage of the N stages in sequence in a cyclic manner.

9. A method according to claim 6 wherein,
the ciphering process is performed in N stages and is performed with M parallel processing blocks, M being less than N.

10. A method according to claim 9 wherein,
each of the M parallel processing blocks processes more than one sequential key relating to a same base key.

11. A method according to claim 1 wherein,
the process other than stores in advance all of the sequentially extracted keys relating to a same base key.

12. A method according to claim 1 wherein,
the process supports multiple data threads.

13. A method according to claim 1 wherein,
the plurality of first sequential keys are used to cipher a single data thread.

14. A method according to claim 8 wherein,
the extraction is performed according to a process associated with each stage of the N stages.

15. A cipher processor comprising:
a pipeline processor comprising N stages, each stage for extracting a sequential key and for ciphering of data using the extracted sequential key, the pipeline for providing at least the sequential key in a feed forward fashion to a subsequent stage for subsequent extraction therefrom of a subsequent sequential key, the extracted sequential keys for use in a ciphering stage and for being fed forward to a subsequent stage but other than for long term storage within memory of the cipher processor, wherein a first stage receives another base key during processing of sequential keys based on a second other base key.

16. A cipher processor according to claim 15 wherein,
the pipeline processor comprises N stages, N being equal to a number of the first sequential keys to be extracted.

17. A cipher processor according to claim 16 wherein,
N equals at least one of 10, 12, and 14.

18. A cipher processor according to claim 15 wherein,
a number of the first sequential keys to be extracted is a whole number multiple of the number of stages, N.

19. A cipher processor according to claim 15 wherein,
a first stage of the cipher processor receives another base key during processing of the sequential keys by a subsequent stage of the cipher processor based on a second other base key, and wherein each stage is for processing of data based on two or more sequential keys relating to a same base key.

20. A cipher processor according to claim 15 wherein,
the cipher processor comprises each of the stages disposed for parallel processing different data and different sequential keys.

21. A cipher processor according to claim 15 absent an expanded key store.

22. A cipher processor according to claim 15 further comprising,
circuitry for supporting multiple data threads.

23. A cipher processor according to claim 15 wherein, the sequential keys are related to a same base key and are extracted in sequence to cipher a single data thread.

24. A computer readable storage medium having stored therein data according to a predetermined computing device format, and upon execution of the data by a suitable computing device a security method is provided comprising:
providing a first base key for extracting therefrom multiple of first sequential security keys;
sequentially extracting from the first base key a plurality of first sequential security keys including a first sequential key;
storing the first sequential key in a memory
providing a second base key for extracting therefrom multiple second sequential security keys;
sequentially extracting from the second base key a plurality of second sequential security keys including a second sequential key; and
overwriting said first sequential key stored in the memory with the second sequential key subsequently extracted prior to completely extracting all of the multiple first sequential security keys relating to the first base key.

25. A computer readable storage medium having stored therein data according to a predetermined computing device format, and upon execution of the data by a suitable computing device a circuit for implementing a security method is provided comprising:
a pipeline processor comprising N stages, each stage for extracting a sequential key and for ciphering of data using the extracted sequential key, the pipeline for providing at least the sequential key in a feed forward fashion to a subsequent stage for subsequent extraction therefrom of a subsequent sequential key, the extracted sequential keys for use in a ciphering stage and for being fed forward to a subsequent stage but other than for long term storage within memory of the cipher processor, wherein a first stage receives another base key during processing of sequential keys based on a second other base key.

* * * * *

UNITED STATES PATENT AND TRADEMARK OFFICE
CERTIFICATE OF CORRECTION

| | | |
|---|---|---|
| PATENT NO. | : 7,889,861 B2 | Page 1 of 1 |
| APPLICATION NO. | : 11/898535 | |
| DATED | : February 15, 2011 | |
| INVENTOR(S) | : Michael Borza | |

It is certified that error appears in the above-identified patent and that said Letters Patent is hereby corrected as shown below:

Column 7, Line 27    Remove the word "of"

Column 9, Line 9     Remove the word "of"

Signed and Sealed this

Seventeenth Day of May, 2011

David J. Kappos
*Director of the United States Patent and Trademark Office*